United States Patent [19]

Witters et al.

[11] Patent Number: 4,876,695
[45] Date of Patent: Oct. 24, 1989

[54] DIGITAL DATA TRANSMISSION SYSTEM HAVING ADDITIONAL BITS FOR AUXILIARY DATA

[75] Inventors: Hugo F. J. Witters, Berlaar; Joannes C. A. M. Wouters, Schoten, both of Belgium

[73] Assignee: Alcatel N.V., Amsterdam, Netherlands

[21] Appl. No.: 62,145

[22] Filed: Jun. 12, 1987

[30] Foreign Application Priority Data

Jun. 13, 1986 [BE] Belgium ............................. 2/60994

[51] Int. Cl.⁴ .................... H04B 3/36; H04L 25/20
[52] U.S. Cl. ................................. 375/3; 375/19; 341/55; 370/110.1
[58] Field of Search ................ 375/3, 3.1, 19, 28, 375/29, 37, 38, 40; 455/601; 370/110.1, 16; 341/55, 106

[56] References Cited

U.S. PATENT DOCUMENTS

| | | | |
|---|---|---|---|
| 3,783,383 | 1/1974 | Forster et al. | 375/19 |
| 3,825,832 | 7/1974 | Frei et al. | 375/26 |
| 3,995,264 | 11/1976 | Ouchi | 371/55 |
| 4,003,041 | 1/1977 | Van Duuren et al. | 375/19 |
| 4,387,364 | 6/1983 | Shirota | 375/19 |
| 4,539,691 | 9/1985 | Ogawa et al. | 375/37 |
| 4,547,890 | 10/1985 | Gindi | 375/19 |
| 4,550,403 | 10/1985 | Beynie | 370/110.1 |
| 4,553,128 | 11/1985 | Pilost | 375/28 |
| 4,626,826 | 12/1986 | Fukuda et al. | 375/19 |
| 4,641,324 | 2/1987 | Karsh et al. | 375/76 |
| 4,704,713 | 11/1987 | Haller et al. | 455/601 |
| 4,704,714 | 11/1987 | Tomizawa et al. | 370/16 |

OTHER PUBLICATIONS

Electronics Letters, May 1965, vol. 1, No. 3, "Low-Disparity Binary Coding System," pp. 67, 68, by R. O. Carter.

Primary Examiner—Robert L. Griffin
Assistant Examiner—Stephen Chin
Attorney, Agent, or Firm—Christie, Parker & Hale

[57] ABSTRACT

Data transmission system for transmitting data on a cable and in two directions between two terminal stations (LTE½) and via repeater stations (REP½). Each terminal station has a sender/receiver (CODEC) and each repeater station has a receiver/sender (CODEC½) for each direction. Each station is able to convert predetermined 5-bit data words and auxiliary information into predetermined 6-bit data words and to extract auxiliary information from these 6-bit words. In the case of cable rupture the receiver for one direction in a repeater station is connected to the receiver for the other direction.

20 Claims, 4 Drawing Sheets

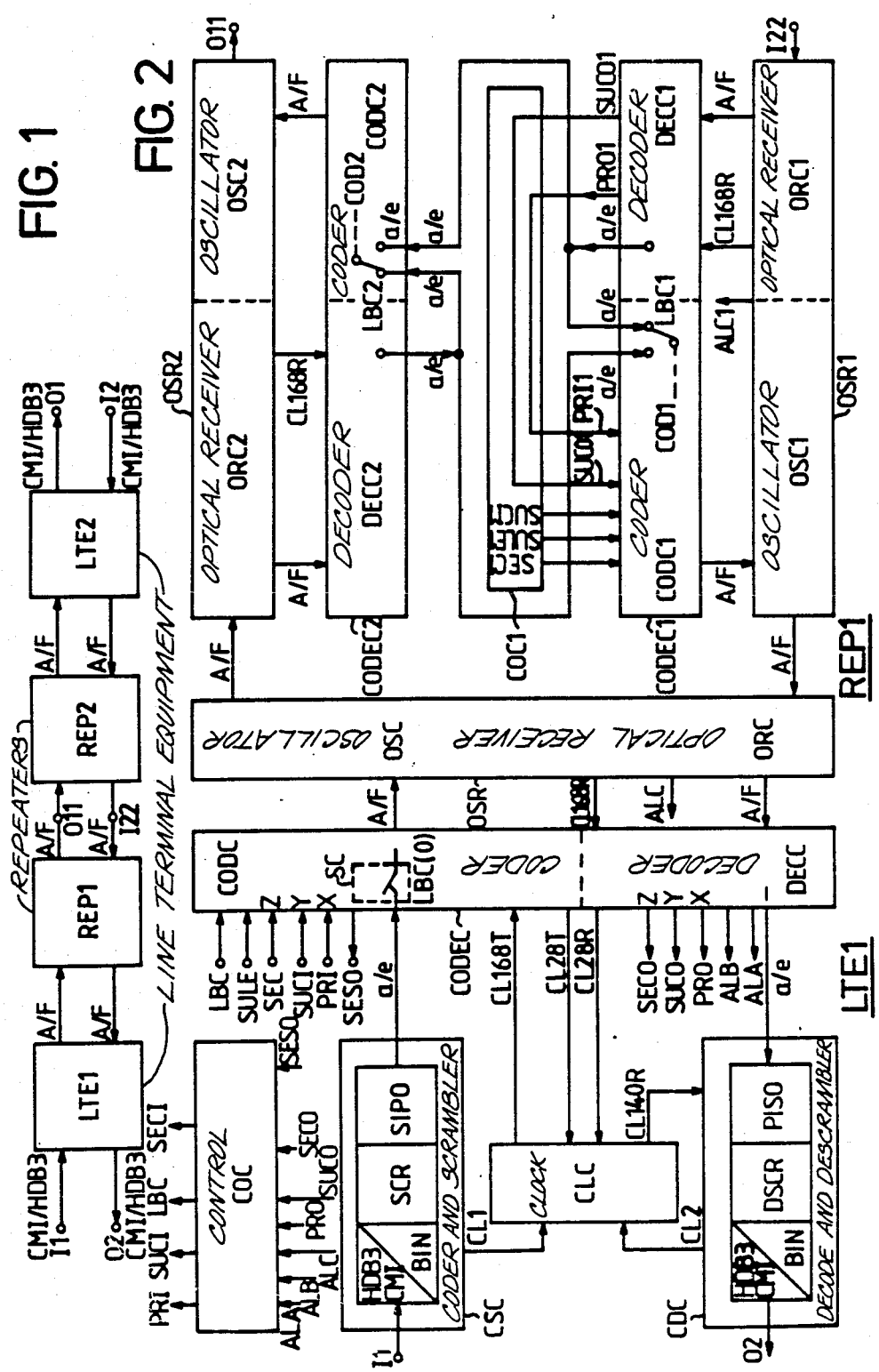

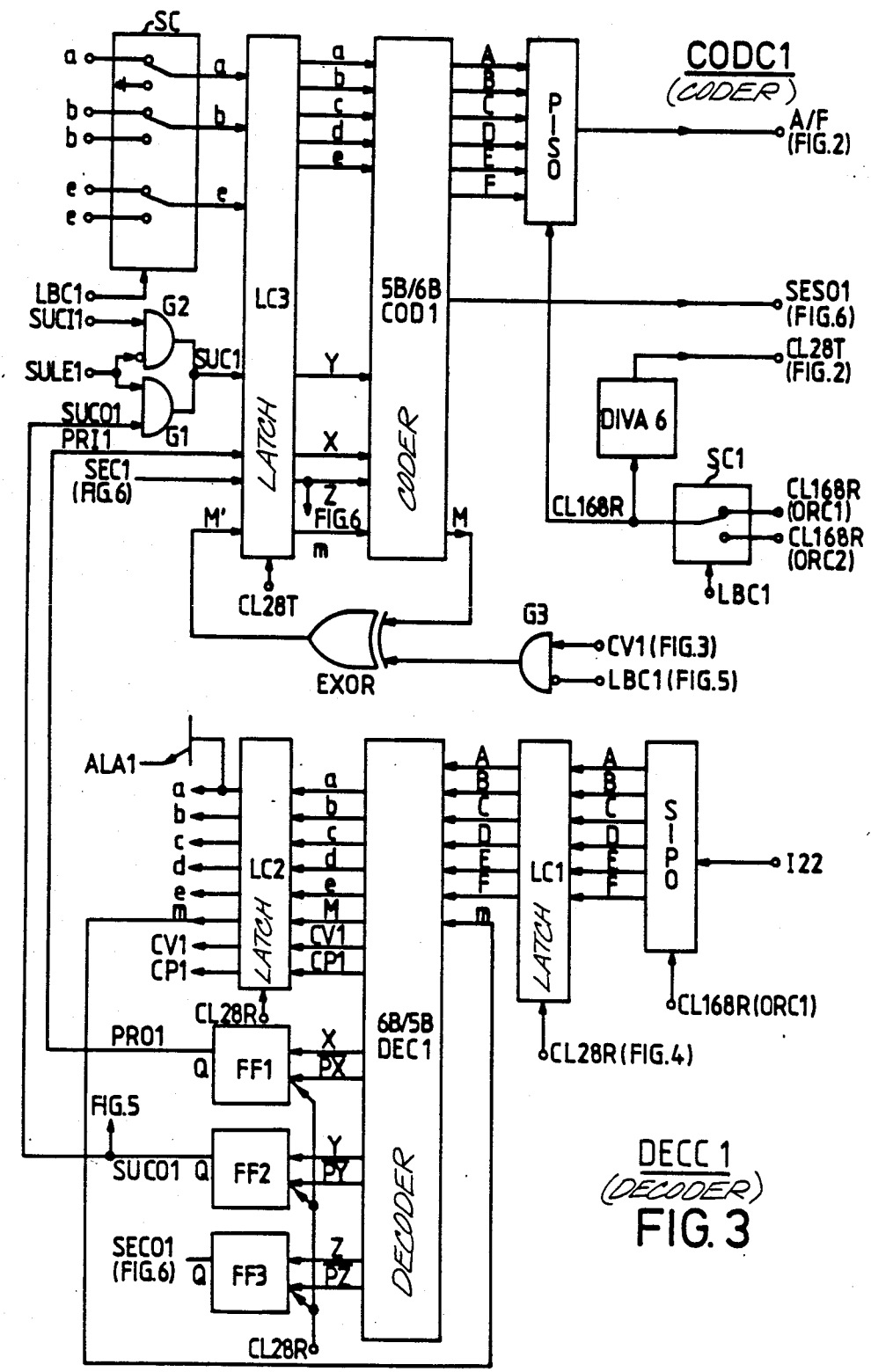

DIGITAL DATA TRANSMISSION SYSTEM HAVING ADDITIONAL BITS FOR AUXILIARY DATA

TECHNICAL FIELD

The present invention relates to a digital data transmission system, and more particularly to such a system in which pbit data words are converted into q-bit transmission words.

BACKGROUND ART

An article in "Electronic Letters", May 1965, Vol. 1, No. 3, pp. 67–68, discloses a low-disparity binary coding system for transmitting a digital signal from a first to a second station over a transmission medium, including a sender unit which converts serial 8-bit words of said digital signal into low disparity serial 9-bit words, and a receiver unit which converts received serial 9-bit words back into the original serial 8-bit words. To the extent it may be useful in understanding and practicing the present invention, that article is hereby incorporated by reference.

DISCLOSURE OF INVENTION

An object of the present invention is to provide a digital data transmission system which is able to also transmit an auxiliary digital signal by combining it with the primary digital data signal in a relatively simple way and such that the extraction of the auxiliary signal from the combined transmission signal is also easy.

Applicant's novel repeater station includes for each direction of transmission a receiver/sender unit comprising cascade-connected receiver and sender units which are able to convert q-bit words into p-bit words and vice-versa, respectively. Each of the sender units is able to convert at least one predetermined p-bit word together with a second signal into a predetermined q-bit word, whilst each of the receiver units is able to convert a said predetermined q-bit word back into a predetermined p-bit word and a second signal. Thus, the first and second signals are converted into a combined digital signal by a simple word conversion operation and this second signal may be extracted from the first by a second simple word conversion operation.

Another, more specific, aspect of the present data transmission system is that the receiver unit of said receiver/sender unit supplies said p-bit words in parallel to its associated sender unit. Thus the receiver/sender unit of a repeater station does not have to be provided with parallel-to-series and series-to-parallel conversion means between the receiver and sender units. The receiver/sender unit is therefore relatively simple.

Still another specific aspect of the disclosed data transmission system is that the receiver/sender unit provided in the repeater station for one direction of transmission includes switching means for connecting, in case of a failure of the transmission medium for one direction of transmission, the output of the receiver unit for the other direction to the input of the sender unit of said one direction, thus enabling the combined digital signals to be transmitted in said one direction via a part of the transmission medium which presents no failure. By making use of the receiver unit for the other direction of transmission as a source of predetermined p-bit words for the sender unit of the one direction, a second digital signal, e.g. concerning a cable failure, may thereby be transmitted by this sender unit on the part of the transmission medium which is not affected by the failure. Thus a very reliable system is obtained. Moreover, this system is more economical than one which would require each repeater station to generate p-bit words.

In accordance with yet another specific aspect of the present invention, novel converter means is used to convert at least one predetermined p-bit data word (together with an auxiliary digital data signal) into a predetermined q-bit data word. The digital data signal is derived from an analog data signal in a delta modulator circuit which includes the cascade connection of a sampler circuit, an integrator circuit and a comparator circuit wherein said analog data signal and the output signal of said integrator circuit are compared, said sampler circuit being clocked by a word clock signal and by a signal indicating the presence of said predetermined p-bit word and said digital data signal being provided at the output of said comparator circuit.

In accordance with still another specific aspect of the present invention, novel means are also provided for converting said q-bit data words back into p-bit words and the digital data signal. An analog data signal is derived from said digital data signal in a demodulator circuit which includes the cascade connection of a sampler circuit, to which said digital data signal is supplied, and an integrator circuit, which provides said analog data signal at its output, the sampler circuit being clocked by a word clock signal and by a signal indicating the presence of the q-bit data word containing the auxiliary digital data. By clocking the sampler circuits in the modulation circuit as well as in the demodulator circuit with signals indicating the presence of predetermined p-bit and q-bit words, it is not necessary to provide the converting means with clock recovery means.

Another aspect of the invention relates to a data transmission system including means for converting p-bit data words into q-bit data words, wherein said converter means further includes register means for registering information concerning at least one of the p-bit data words adjacent to a predetermined p-bit data word, and gating means to which a plurality of digital data signals are applied and which are controlled by the registering means in such a way that said at least one of said plurality of digtal data signals is selected as a function of the registered information. In this way, each predetermined p-bit data word may be combined with different digital data signals.

BRIEF DESCRIPTION OF DRAWINGS

The above mentioned and other objects and features of the invention will become more apparent and the principles underlying the invention itself will be better understood by referring to the following description of a presently preferred embodiment thereof taken in conjunction with the accompanying drawings wherein:

FIG. 1 is a schematic diagram of a data transmission system according to the invention;

FIG. 2 is a more detailed schematic diagram of line terminal equipment LTE1 and repeater circuit REP1 of FIG. 1;

FIGS. 3 and 4 represent coder circuit CODC1 and decoder circuit DECC1 of FIG. 2 in more detail;

BEST MODE FOR CARRYING OUT THE INVENTION

Figure 4:
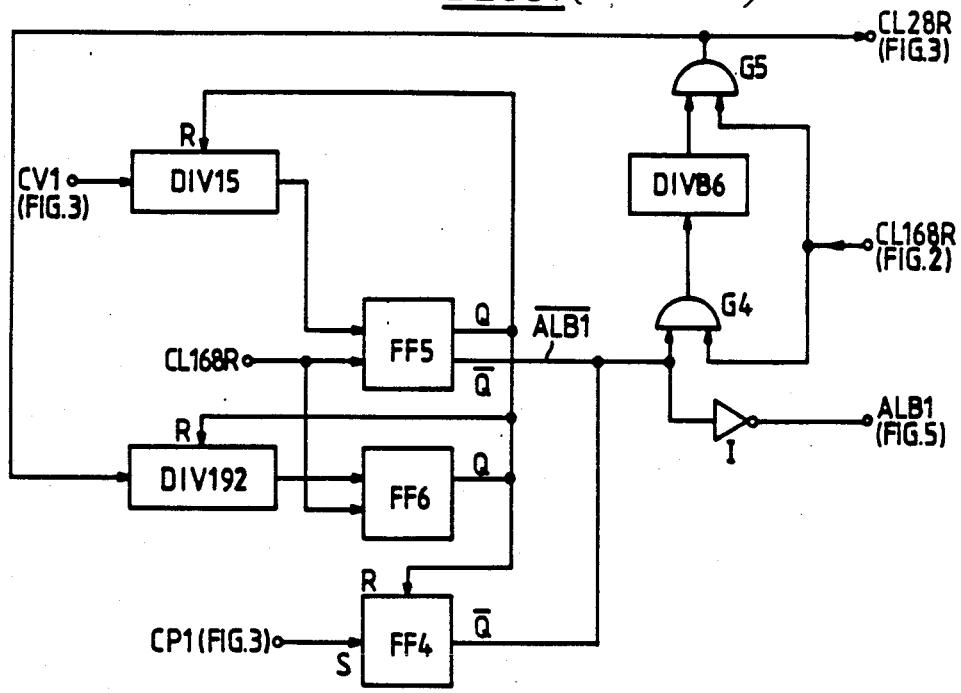

Referring to FIG. 1 the data transmission system shown therein is an electrical/optical system which is constituted by the cascade connection of a line terminal equipment LTE1, like repeater stations REP1 and REP2 and a line terminal equipment LTE2 which is similar to line termination equipment LTE1. This system is able to transmit data from input I1 of line termination equipment LTE1 to output O1 of line termination equipment LTE 2 and from input I2 of line termination equipment LTE2 to output O2 of line termination equipment LTE1. The data applied to I1 or I2 are for instance PCM signals in accordance with CCITT Recommendation G703 i.e. data coded in CMI (Coded Mark Inversion) and having a bit rate of about 140 Mbit/sec. (exactly 139.264 Mbit/sec.) or data coded in HDB3 and having a bit rate of about 34 Mbit/sec (exactly 34.368 Mbit/sec.).

The transmission of data from I1 to O1 is similar to that from I2 to O2 and therefore only the first is considered, with an assumed bit rate of about 140 Mbit/sec. In the line terminal equipment LTE1 the CMI code of an incoming data stream is first converted into a pure binary code and the data of the thus obtained bit stream are then scrambled. Afterwards each of the possible 32 5-bit words of this bit stream is coded into a corresponding 6-bit word according to a conversion table which will be considered in detail later. Three of these 5-bit words may be converted together with other data signals or auxiliary information X, $\overline{X}$, Y, $\overline{Y}$, Z, $\overline{Z}$, into auxiliary 6-bit words as will be explained later. Finally, the thus obtained data stream is optically transmitted to the repeater circuit REP1 at a bit rate of about 168 Mbit/sec. The latter higher bit rate has been so chosen that the 6-bit word rate (168/6 Mbit/sec.) is equal to the 5-bit word rate (140/5 Mbit/sec.). In the repeater station REP1 the 6-bit code words of the incoming optical bit stream are decoded into electrical 5-bit code words and auxiliary information and these 5-bit words are then again coded into electrical 6-bit words and new auxiliary information may be inserted in one or more of the auxiliary 6-bit words. The 168 Mbit/sec. data stream is optically transmitted to the repeater circuit REP2 which operates in the same way as repeater REP1 and from there it is conveyed to the line terminal equipment LTE2.

Therein the 6-bit words of the incoming data stream are decoded to 5-bit words and the data of the thus obtained bit stream are then unscrambled and finally coded into CMI code. The resultant data stream appears at the output O1 of line termination equipment LTE2.

The above mentioned 5-bit/6-bit word conversion table is as follows:

| 5-bit words | | | | | n | 6-bit words m = 0 | | | | | | M | N | D | m = 1 | | | | | | M | N | D |
|---|---|---|---|---|---|---|---|---|---|---|---|---|---|---|---|---|---|---|---|---|---|---|---|
| a | b | c | d | e | | A | B | C | D | E | F | | | | A | B | C | D | E | F | | | |
| 0 | 0 | 0 | 0 | 0 | 0 | 1 | 0 | 1 | 0 | Z | $\overline{Z}$ | 0 | 3 | 0 | 1 | 0 | 1 | 0 | Z | $\overline{Z}$ | 1 | 3 | 0 |
| 0 | 0 | 0 | 0 | 1 | 1 | 1 | Y | 0 | $\overline{Y}$ | 0 | 1 | 0 | 3 | 0 | 1 | Y | 0 | $\overline{Y}$ | 0 | 1 | 1 | 3 | 0 |
| 0 | 0 | 0 | 1 | 0 | 1 | 1 | X | 0 | $\overline{X}$ | 1 | 0 | 0 | 3 | 0 | 1 | X | 0 | $\overline{X}$ | 1 | 0 | 1 | 3 | 0 |
| 0 | 0 | 0 | 1 | 1 | 2 | 1 | 1 | 1 | 1 | 0 | 0 | 1 | 4 | 1 | 0 | 0 | 0 | 0 | 1 | 1 | 0 | 2 | −1 |
| 0 | 0 | 1 | 0 | 0 | 1 | 1 | 1 | 1 | 0 | 0 | 0 | 0 | 3 | 0 | 1 | 1 | 1 | 0 | 0 | 0 | 1 | 3 | 0 |
| 0 | 0 | 1 | 0 | 1 | 2 | 1 | 1 | 1 | 0 | 1 | 0 | 1 | 4 | 1 | 0 | 0 | 0 | 1 | 0 | 1 | 0 | 2 | −1 |
| 0 | 0 | 1 | 1 | 0 | 2 | 1 | 1 | 1 | 0 | 0 | 1 | 1 | 4 | 1 | 0 | 0 | 0 | 1 | 1 | 0 | 0 | 2 | −1 |
| 0 | 0 | 1 | 1 | 1 | 3 | 0 | 0 | 0 | 1 | 1 | 1 | 0 | 3 | 0 | 0 | 0 | 0 | 1 | 1 | 1 | 1 | 3 | 0 |
| 0 | 1 | 0 | 0 | 0 | 1 | 1 | 1 | 0 | 1 | 0 | 0 | 0 | 3 | 0 | 1 | 1 | 0 | 1 | 0 | 0 | 1 | 3 | 0 |
| 0 | 1 | 0 | 0 | 1 | 2 | 1 | 1 | 0 | 1 | 1 | 0 | 1 | 4 | 1 | 0 | 0 | 1 | 0 | 0 | 1 | 0 | 2 | −1 |
| 0 | 1 | 0 | 1 | 0 | 2 | 1 | 1 | 0 | 1 | 0 | 1 | 1 | 4 | 1 | 0 | 0 | 1 | 0 | 1 | 0 | 0 | 2 | −1 |
| 0 | 1 | 0 | 1 | 1 | 3 | 0 | 0 | 1 | 0 | 1 | 1 | 0 | 3 | 0 | 0 | 0 | 1 | 0 | 1 | 1 | 1 | 3 | 0 |
| 0 | 1 | 1 | 0 | 0 | 2 | 1 | 1 | 0 | 0 | 1 | 1 | 1 | 4 | 1 | 0 | 0 | 1 | 1 | 0 | 0 | 0 | 2 | −1 |
| 0 | 1 | 1 | 0 | 1 | 3 | 0 | 0 | 1 | 1 | 0 | 1 | 0 | 3 | 0 | 0 | 0 | 1 | 1 | 0 | 1 | 1 | 3 | 0 |
| 0 | 1 | 1 | 1 | 0 | 3 | 0 | 0 | 1 | 1 | 1 | 0 | 0 | 3 | 0 | 0 | 0 | 1 | 1 | 1 | 0 | 1 | 3 | 0 |
| 0 | 1 | 1 | 1 | 1 | 4 | 0 | 0 | 1 | 1 | 1 | 1 | 1 | 4 | 1 | 1 | 1 | 0 | 0 | 0 | 0 | 0 | 2 | −1 |
| 1 | 0 | 0 | 0 | 0 | 1 | 1 | 0 | 1 | 1 | 0 | 0 | 0 | 3 | 0 | 1 | 0 | 1 | 1 | 0 | 0 | 1 | 3 | 0 |
| 1 | 0 | 0 | 0 | 1 | 2 | 1 | 0 | 1 | 1 | 1 | 0 | 1 | 4 | 1 | 0 | 1 | 0 | 0 | 0 | 1 | 0 | 2 | −1 |
| 1 | 0 | 0 | 1 | 0 | 2 | 1 | 0 | 1 | 1 | 0 | 1 | 1 | 4 | 1 | 0 | 1 | 0 | 0 | 1 | 0 | 0 | 2 | −1 |
| 1 | 0 | 0 | 1 | 1 | 3 | 0 | 1 | 0 | 0 | 1 | 1 | 0 | 3 | 0 | 0 | 1 | 0 | 0 | 1 | 1 | 1 | 3 | 0 |
| 1 | 0 | 1 | 0 | 0 | 2 | 1 | 0 | 1 | 0 | 1 | 1 | 1 | 4 | 1 | 0 | 1 | 0 | 1 | 0 | 0 | 0 | 2 | −1 |
| 1 | 0 | 1 | 0 | 1 | 3 | 0 | 1 | 0 | 1 | 0 | 1 | 0 | 3 | 0 | 0 | 1 | 0 | 1 | 0 | 1 | 1 | 3 | 0 |
| 1 | 0 | 1 | 1 | 0 | 3 | 0 | 1 | 0 | 1 | 1 | 0 | 0 | 3 | 0 | 0 | 1 | 0 | 1 | 1 | 0 | 1 | 3 | 0 |
| 1 | 0 | 1 | 1 | 1 | 4 | 0 | 1 | 0 | 1 | 1 | 1 | 1 | 4 | 1 | 1 | 0 | 1 | 0 | 0 | 0 | 0 | 2 | −1 |
| 1 | 1 | 0 | 0 | 0 | 2 | 1 | 0 | 0 | 1 | 1 | 1 | 1 | 4 | 1 | 0 | 1 | 1 | 0 | 0 | 0 | 0 | 2 | −1 |
| 1 | 1 | 0 | 0 | 1 | 3 | 0 | 1 | 1 | 0 | 0 | 1 | 0 | 3 | 0 | 0 | 1 | 1 | 0 | 0 | 1 | 1 | 3 | 0 |
| 1 | 1 | 0 | 1 | 0 | 3 | 0 | 1 | 1 | 0 | 1 | 0 | 0 | 3 | 0 | 0 | 1 | 1 | 0 | 1 | 0 | 1 | 3 | 0 |
| 1 | 1 | 0 | 1 | 1 | 4 | 0 | 1 | 1 | 0 | 1 | 1 | 1 | 4 | 1 | 1 | 0 | 0 | 1 | 0 | 0 | 0 | 2 | −1 |
| 1 | 1 | 1 | 0 | 0 | 3 | 0 | 1 | 1 | 1 | 0 | 0 | 0 | 3 | 0 | 0 | 1 | 1 | 1 | 0 | 0 | 1 | 3 | 0 |
| 1 | 1 | 1 | 0 | 1 | 4 | 0 | 1 | 1 | 1 | 0 | 1 | 1 | 4 | 1 | 1 | 0 | 0 | 0 | 1 | 0 | 0 | 2 | −1 |
| 1 | 1 | 1 | 1 | 0 | 4 | 0 | 1 | 1 | 1 | 1 | 0 | 1 | 4 | 1 | 1 | 0 | 0 | 0 | 0 | 1 | 0 | 2 | −1 |
| 1 | 1 | 1 | 1 | 1 | 5 | 1 | 0 | 0 | 0 | 1 | 1 | 0 | 3 | 0 | 1 | 0 | 0 | 0 | 1 | 1 | 1 | 3 | 0 |

The above table comprises 10 columns:
column 1 contains the 32 possible 5-bit words abcde;
column 2 indicates the number n of 1's in the corresponding 5-bit words;
column 3 contains the 6-bit words ABCDEF with disparity 0 or 1 corresponding to these 5-bit words abcde when the incoming mode is m=0, this mode m being the one used to derive the 6-bit words from the 5-bit words. (The mode m is the accumulated disparity which is defined as the overall disparity of the 6-bit words up to a given time and is represented by m=0 or m=1. The disparity D of a word is defined as half the difference between the number of 1's and the number of 0's of this word); p1 column 4 indicates the outgoing mode M, i.e., the incoming mode m to be used for the following conversion. M is so chosen that in the whole bit stream the total number of 1's is substantially equal to the total number of 0's. For this reason the outgoing code M is maintained equal to incoming mode m when the word disparity D=0, whereas it is changed when the word disparity D=1;

column 5 indicates the number N of 1's in the corresponding 6-bit words of column 3;

column 6 indicates the disparity D of these words;

columns 7, 8, 9 and 10 are similar to 3, 4, 5 and 6 respectively, but the 6-bit words in column 7 are words for which the incoming mode m=1. The latter words have a disparity 0 or −1.

The upper three words of each of the columns 3 and 7 are the above mentioned auxiliary words used to convey auxiliary information bits X, $\bar{X}$, Y, $\bar{Y}$, Z, $\bar{Z}$ with X, Y, Z either 0 or 1. In the present case, X is for instance protection information, Y is supervision information and Z is service information, as well be explained later.

From the above table it also follows that for all the 6-bit words the number N of 1's is equal to 2, 3 or 4 so that their disparity D is equal to −1, 0, and +1 respectively and that for the 6-bits words for which N=2 the associated outgoing mode M is 0, whereas for the 6-bit words for which N=4 the outgoing mode M is 1. For the 6-bit words for which N=3 the outgoing mode M is kept equal to the incoming mode m and the latter is either 0 or 1.

The above word conversion table has been chosen because each 5-bit word abode may be relatively easily converted into a 6-bit word ABODE and vice-versa. Indeed, this table may also be represented in the following form:

| n | Number of words abcde | D | m = 0 | | | | | | | | m = 1 | | | | | | |
|---|---|---|---|---|---|---|---|---|---|---|---|---|---|---|---|---|---|
| | | | A | B | C | D | E | F | M | D | A | B | C | D | E | F | M |
| 2 | 10 | +1 | 1 | $\bar{a}$ | $\bar{b}$ | $\bar{c}$ | $\bar{d}$ | $\bar{e}$ | 1 | −1 | 0 | a | b | c | d | e | 0 |
| 4 | 5 | +1 | 0 | a | b | c | d | e | 1 | −1 | 1 | $\bar{a}$ | $\bar{b}$ | $\bar{c}$ | $\bar{d}$ | $\bar{e}$ | 0 |
| 3 | 10 | 0 | | | | | | | | 0 | a | b | c | d | e | | |
| 5 | 1 | 0 | | | | | | | | 1 | $\bar{a}$ | $\bar{b}$ | $\bar{c}$ | d | e | | |
| 1 (with a+b+c=1) | 3 | 0 | | | | | | | | 1 | a | $\bar{b}$ | $\bar{c}$ | d | e | | |
| 1 (with a+b+c=0) | 1 (00010) | 0 | | | | | | | | 1 | X | 0 | $\bar{X}$ | 1 | 0 | | |
| | 1 (00001) | 0 | | | | | | | | 1 | Y | 0 | $\bar{Y}$ | 0 | 1 | | |
| 0 | 1 (00000) | 0 | | | | | | | | 1 | 0 | 1 | 0 | Z | $\bar{Z}$ | | |

From this table it follows, when considering a 5-bit word to 6-bit word conversion:

that for each of the 15 5-bit words for which n=2 and n=4 the corresponding 6-bit word has the mode m=0 or m=1, the outgoing mode M is different from m, i.e. M=$\bar{m}$;

that for each of the 17 other 5-bit words for which n=0, 1, 3 and 5 the corresponding 6-bit words again has the mode m=0 or m=1, but that outgoing the mode M remains the same i.e. M=m;

that each of the 5-bit words 00010, 00001 and 0000 may be converted in one of two corresponding auxiliary information 6-bit words containing the auxiliry information X, Y, Z and $\bar{X}$, $\bar{Y}$, $\bar{Z}$. X, Y, Z may each be either 0 or 1.

The 6-bit word to 5-bit word conversion is performed in a similar way.

The above mentioned words are often called channels and it is clear that when one of the last mentioned 5-bit words or channels is received, e.g. in line termination equipment LTE1, it is converted therein together with auxiliary information into a corresponding auxiliary 6-bit word. This word is then transmitted, e.g. to line termination equipment LTE2, where it is again converted into the original 5-bit word and auxiliary information. From the above it follows that the transmission of auxiliary information is transparent to the sender and receiver of this 5-bit word.

The 5-bit word (abcde) to 6-bit word (ABCDEF) coding operation according to the above table may be represented by the following Boolean functions:

$$A = n2 \cdot a\bar{m} + n4 \cdot m + n0 + n1 + n5 \quad (1)$$
$$B = (A \cdot \bar{a} + \bar{A} \cdot a) \cdot \overline{n0} \cdot k2 + n1 \cdot (d \cdot X + e \cdot Y) \quad (2)$$
$$C = (A \cdot \bar{b} + \bar{A} \cdot b) \cdot k2 + n0 \quad (3)$$
$$D = (A \cdot \bar{c} + \bar{A} \cdot c) \cdot k2 \cdot \overline{n0} + n1 \cdot (d \cdot \bar{X} + e \cdot \bar{Y}) \quad (4)$$
$$E = d \cdot \overline{k3} + \bar{d} \cdot k3 + n0 \cdot Z \quad (5)$$
$$F = e \cdot \overline{k3} + \bar{e} \cdot k3 + n0 \cdot Z \quad (6)$$
$$M = m \cdot \overline{k1} + \bar{m} \cdot k1 \quad (7)$$

wherein:

$$k1 = n2 + n4 \quad (8)$$
$$k2 = \overline{n1} \cdot (d \cdot e + \bar{d} \cdot \bar{e}) \quad (9)$$
$$k3 = A \cdot \overline{n1} \cdot \overline{n5} \quad (10)$$

and n0, n1, n2, n3, n4 and n5 are bits which are set to when and only when the number n of 1's in the 5-bit word abcde is equal to 0, 1, 2, 3, 4 and 5 respectively.

Letting u4u2u1 equal the 3-bit binary sum of bits a, b, c, d and e, the following relations exist:

$$n0 = \overline{u1} \cdot \overline{u2} \cdot \overline{u4} \quad (11)$$
$$n1 = u1 \cdot \overline{u2} \cdot \overline{u4} \quad (12)$$
$$n2 = \overline{u1} \cdot u2 \quad (13)$$
$$n3 = u1 \cdot u2 \quad (14)$$
$$n4 = \overline{u1} \cdot u4 \quad (15)$$
$$n5 = u1 \cdot u4 \quad (16)$$

Likewise, the 6-bit word (ABCDEF) to 5-bit word (abcde) decoding operation according to the above table may be represented by the following Boolean functions:

$$a = (\bar{B} \cdot A + B \cdot \bar{A}) \cdot \overline{k4} \quad (17)$$
$$b = (\bar{C} \cdot A + C \cdot \bar{A}) \cdot \overline{k4} \quad (18)$$
$$c = (\bar{D} \cdot A + D \cdot \bar{A}) \cdot \overline{k4} \quad (19)$$
$$d = (\bar{E} \cdot k5 + E \cdot \overline{k5}) \cdot \overline{k4} \cdot \bar{C} \quad (20)$$
$$e = (\bar{F} \cdot k5 + F \cdot \overline{k5}) \cdot \overline{k4} \cdot \bar{C} \quad (21)$$
$$M = m \cdot N3 + N4 + N5 + N6 \quad (22)$$

wherein:

$$k4 = A \cdot N3 \cdot (E \cdot \bar{F} + \bar{E} \cdot F) \quad (23)$$

$$k5 = A \cdot \overline{N3} \quad (24)$$

and N0, N1, N2, N3, N4, N5 and N6 are bits which are 1 when and only when the number N of 1's in the 6-bit word ABCDEF is equal to 0, 1, 2, 3, 4, 5 and 6 respectively.

Letting U4 U2 U1 represent the 3-bit binary sum of bits A, B, C, D, E and F:

$$N0 = \overline{U1} \cdot \overline{U2} \cdot \overline{U4} \quad (25)$$
$$N1 = U1 \cdot \overline{U2} \cdot \overline{U4} \quad (26)$$
$$N2 = \overline{U1} \cdot U2 \cdot \overline{U4} \quad (27)$$
$$N3 = U1 \cdot U2 \quad (28)$$
$$N4 = \overline{U1} \cdot \overline{U2} \cdot U4 \quad (29)$$
$$N5 = U1 \cdot U4 \quad (30)$$
$$N6 = U2 \cdot U4 \quad (31)$$

The auxiliary information bits X, Y, Z obtained are defined by the following Boolean functions:

$$X = k4 \cdot B \cdot E \quad (32)$$
$$Y = k4 \cdot B \cdot F \quad (33)$$
$$Z = k4 \cdot C \cdot E \quad (34)$$

Prior to considering FIG. 2, it should be reminded that by means of the above mentioned auxiliary 6-bit words, auxiliary information bits X, Y, and Z, respectively may be transmitted. Because such an auxiliary 6-bit word is obtained by converting an auxiliary information bit, say X, together with the corresponding 5-bit word 00010 applied to the coder circuit of line termination equipment LTE1 the transmission rate of the auxiliary information X is on the average equal to $140/5 \times 32$ Mbit/sec. since on the average one word among 32 words is 00010. Consequently, when the auxiliary information bit X is for instance applied to the coder circuit at a speed of 2,400 kbit/sec. it will be transmitted a number of times.

As already mentioned the information X, $\overline{X}$, Y, $\overline{Y}$ and Z, $\overline{Z}$ is for instance protection, supervision and service information respectively and are transmitted in corresponding protection switching, supervision and service channels. Protection information for instance concerns the condition of protection circuits and associated systems located in the terminal equipments line termination equipment LTE1 and line termination equipment LTE2; supervision information is for instance alarm information; and service information is e.g. speech information. Each of the line terminal equipments LTE1 and LTE2 is able to receive and transmit any of these three types of information, and in each of the repeater circuits REP1 and REP2, protection information is simply switched through, supervision information is received and moreover either switched through or replaced by new supervision information may, and service information is received and moreover either switched through or replaced by new service information. This will be explained later.

Reference is now made to FIG. 2 which represents the line terminal equipment LTE1 and the repeater circuit REP1 of FIG. 1 in more detail.

The line terminal equipment LTE1 is shown in the lefthand part of FIG. 2 and includes a coder and decoder unit CODEC with a coder circuit CODC and a decoder circuit DECC, a coder and scrambler circuit CSC, a coder and descrambler circuit CDC, an optical sender/receiver unit OSR with an optical sender circuit OSC and an optical receiver circuit ORC, a clock circuit CLC, and a control circuit COC including a microprocessor and a telephone circuit (not shown).

The coder and scrambler circuit CSC which includes the cascade connection of a CMI or HDB3-to-binary code converter CMI, HDB3/BIN, a scrambler circuit SCR and a serial-in-parallel-out register SIPO with parallel data output a/e is connected in series with coder circuit CODC and optical sender circuit OSC between serial data input I1 of line termination equipment LTE1 and serial data output A/F of optical sender circuit OSC. Likewise, the optical receiver circuit ORC, the decoder circuit DECC and the decoder and descrambler circuit CDC which includes the cascade connection of a parallel-in-serial-out-register PISO with parallel data input a/e, descrambler circuit DSCR and a binary-to-CMI or HDB3 converter BIN/CMI, HDB3 are connected in cascade between serial data input A/F of optical receiver ORC and data output O2 of line termination equipment LTE1. The circuits CSC and CDC also have respective clock outputs CL1 and CL2 which are connected to the clock circuit CLC.

The optical receiver ORC has a serial data input A/F, a serial data output A/F, a receiver clock output CL168R on which a 168 MHz clock signal is generated and which is connected to the decoder circuit DECC of the coder and decoder unit CODEC, and an alarm output ALC which is activated when a loss of clock signal is detected and which is connected to the control circuit COC.

The decoder circuit DECC includes a decoder proper (not shown) wherein the incoming 6-bit code words A/F are converted into 5-bit code words a/e and auxiliary information X, Y, Z in the way described above (see the relations 17 to 34) and which is associated with circuitry (not shown) able to generate the following signals on the like-named outputs of decoder circuit DECC:

a protection channel output signal PRO, a supervision channel output signal SUCO and a service channel output signal SECO which are derived in decoder circuit DECC from auxiliary information X, Y and Z contained in protection switching, supervision and service channels respectively;

a 28 MHz clock signal CL28R which is applied to the clock circuit CLC. The latter clock circuit includes a phase locked loop (not shown) which in response to the clock signals CL2 and CL28R applied thereat generates a 140 MHz receive clock signal CL140R to control the operation of the decoder and descrambler circuit CDC;

an alarm signal ALA which as will be explained later is activated when wire a of the decoder circuit output a/e is continuously on 0 as a result of the detection of e.g. a transmission cable rupture in one of the station circuits LTE2, REP2, REP1 and LTE1;

an alarm signal ALB which is activated when in the decoder circuit DECC a word misalignment is detected.

The coder circuit CODC includes a coder proper (not shown) wherein the incoming 5-bit code words a/e and the auxiliary information X, Y, Z are converted into 6-bit code words A/F in the way described above (see the relations 1 to 16). The coder proper is associated with circuitry (not shown) for generating a service clock signal SESO=$\overline{no}$ which indicates the presence of the 5-bit service channel word 00000 and is applied to control circuit COC. The coder circuit also provides a 28 MHz transmit clock signal CL28T which is applied to clock circuit CLC. In response to clock signals CL1 and CL28T this clock circuit CLC which includes also a phaselocked loop which generates a 168 MHz transmit clock signal CL168T. The latter signal is applied to CODC to control the operation thereof. CODC also has inputs PRI, SUCI, SEC, SULE and LBC the functions of which will become clear later.

The above mentioned signals ALA, ALB, ALC, PRO, SUCO, SECO, and SESO are all applied to control circuit COC. In response to the receipt of ALA, ALB, ALC as well as of SUCO the control circuit COC takes appropriate measures. It also applies the received signal PRO to a protection circuit (not shown) associated with line termination equipment LTE1, whilst it feeds the received service channel output signal SECO to the telephone station circuit included in control circuit COC. The latter circuit COC is also able to apply a number of auxiliary and control signals to the above mentioned inputs PRI, SUC1, SEC, SULE and LBC of CODC:

- a protection or X-channel input signal PRI to be transmitted by line termination equipment LTE1. In CODC this signal is inserted as bit X in a corresponding auxiliary information channel word 1XO$\bar{X}$10;
- a supervision or Y-channel signal SUC1 to be transmitted by line termination equipment LTE1. In CODC the signal is inserted as bit Y in a corresponding auxiliary information channel word 1Y0$\bar{Y}$01;
- a service or Z-channel signal SEC1 to be transmitted by line termination equipment LTE1. In CODC this signal is inserted as bit Z in a corresponding auxiliary information channel word 1010Z$\bar{Z}$;
  - a supervision loop bit SULE to be used in line termination equipment LTE1, although therein it is continuously on 0 because LTE1 is a line terminal equipment and because therefore no loop has to be realized between CODC and decoder circuit DECC. In a repeater circuit station it is either 0 or 1;
  - a switch circuit control or alarm bit LBC also to be used in line termination equipment LTE1, although it is also continuously on 0 because LTE1 is a line terminal equipment. In a repeater circuit it is 0 or 1. In coder circuit CODC, alarm bit LBC controls a switch circuit SC which interconnects the decoder data output a/e to the input a/e of the coder proper.

The repeater station REP1 is represented in the right hand part of FIG. 2 and includes for each of the directions of transmission an optical sender/receiver unit OSR1/2, a coder/decoder circuit CODEC1/2 which includes a coder circuit CODC1/2 and a decoder circuit DECC1/2, and a common control circuit COC1. Because optical sender/receiver unit OSR1/2, coder and decoder unit CODEC1/2 and control circuit COC1 are similar to optical sender/receiver unit OSR, coder and decoder unit CODEC and control circuit COC respectively they are not described in detail. Signals comparable to those used in line termination equipment LTE1 are indicated by the same references, however provided by an additional reference digit 1. The parallel output a/e of decoder circuit DECC1/2 is connected to parallel input a/e of CODC1/2 and to a parallel input of CODC2/1, and via a switch controlled by a switch control bit LBC1/2 either decoder circuit DECC1/2 or decoder circuit DECC2/1 is connected to the coder proper in CODC1/2. For instance:

with the switches controlled by LBC1 and LBC2 in the positions shown, data entering at input I22 passes successively through optical receiver ORC1, decoder circuit DECC1, CODC1 and optical sender circuit OSC1 before being applied to optical receiver ORC, whilst data leaving optical sender circuit OSC passes successively through optical receiver ORC2, decoder circuit DECC3, CODC2 and optical sender circuit OSC2 before appearing at output terminal 011;

when the switch controlled by LBC1 has for instance been brought in the position opposite to that shown e.g. as a consequence of a rupture of the transmission cable connected to I22, the data supplied by optical sender/receiver unit OSR to decoder circuit DECC2 via optical receiver ORC2 is transmitted simultaneously to CODC2 via the switch controlled by LBC2, as usual, but also to CODC1 via the switch controlled by LBC1. Auxiliary information channels are thus made available therein so that new auxiliary information may be transmitted.

On the other hand the bit a is made 0 (not shown), thus indicating that a cable rupture has occurred, as will be explained later.

A similar switching-over arrangement which is also operative in case of a cable rupture is provided for the clock signals, but this is not shown in FIG. 2.

It should further be noted that the repeater circuit REP1 differs from the line terminal equipment LTE1 in the following points which are only shown for coder and decoder unit CODEC1 but which are similar for coder and decoder unit CODEC2:

- a signal ALA1 is not generated in the decoder circuit DECC1 because when bit a has been made equal to 0 this is communicated to line termination equipment LTE1;
- a protection switching channel output signal PRO1 received by decoder circuit DECC1 is directly applied to protection switching channel input PRI1 of CODC1 for transmission to line termination equipment LTE1;
- a supervision channel output signal SUCOI received by decoder circuit DECC1 is applied to input SUCO1 of CODC1 and either this signal or a new supervision channel input signal SUCI1 provided by control circuit COC1 is applied to CODC1, the selection being effected under the control of the supervision loop enable signal SULE1 also provided by control circuit COC1;
- in a similar way which is therefore not shown in FIG. is a service channel output signal SECO1 received by decoder circuit DECC1 is applied to control circuit COC1 and either this signal or a new service channel input signal SECI1 provided by control circuit COC1 is applied to CODC1, the selection being effected under the control of a service loop enable signal LS provided by control circuit COC1.

Figure 5:
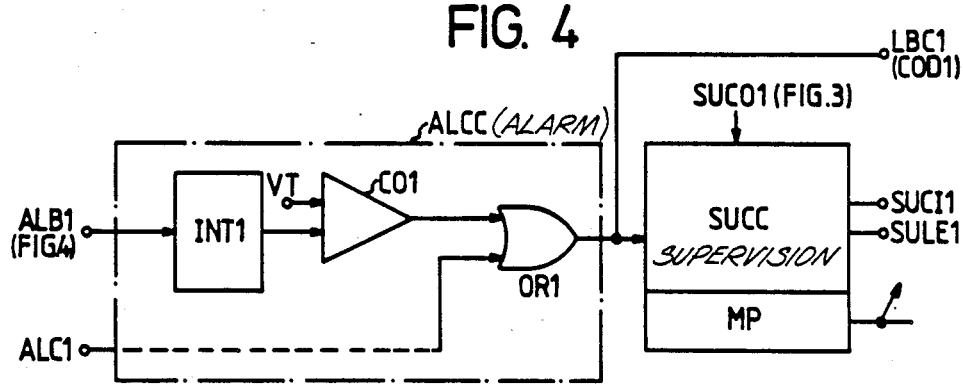
FIGS. 5 and 6 show alarm, service and supervision circuits ALCC, SECC and SUCC forming part of control circuit COC cf FIG. 2 in more detail.
Figure 6:
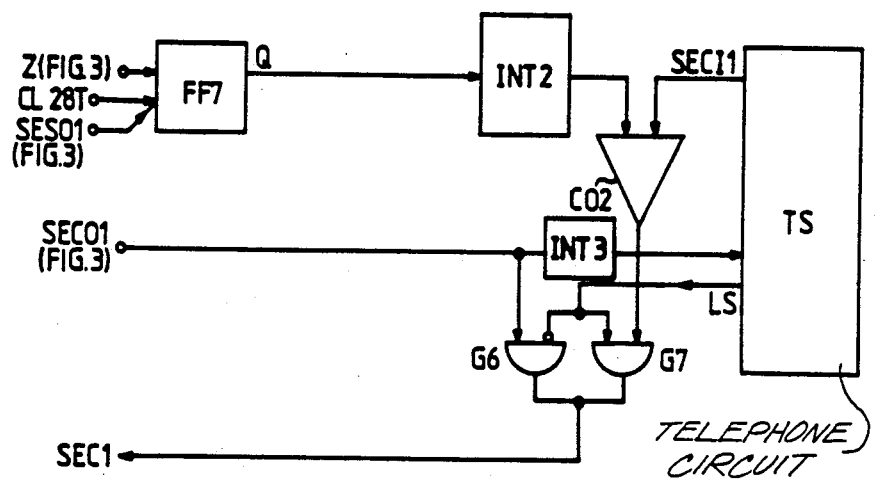

Reference is now made to FIGS. 3 to 6 for a more detailed description of the coder and decoder circuits CODC1 and DECC1 and of the control circuit COC1 forming part of the repeater REP1 shown n FIG. 2. This control circuit COC1 comprises an alarm circuit ALCC (FIG. 5), a supervision circuit SUCC with an associated computer MP (FIG. 5) and a service circuit SECC (FIG. 6).

The serial data input I22 of decoder circuit DECC1 is connected to a serial-in-parallel-out register SIPO controlled by the 168 MHz clock CL168R provided by the optical receiver ORC1. The serial-in-parallel-out register SIPO has six outputs A/F which are connected to a latch circuit LC1 whose outputs A/F are connected to a decoder circuit proper DEC1 and which IS controlled by the word clock CL28R derived from CL168R in a manner which will be described later. In this way, when serial data are applied to data input I22 they are converted into 6-bit words which are supplied to the decoder DEC1 at a rate of 28 Mbit/sec. This decoder circuit DEC1 then converts these 6-bit words into 5-bit words a/e and possible auxiliary informatoon bits X, Y, Z at a rate of 28 Mbit/sec., the bits a to e and X to Z being defined by the above relations (17) to (21) and (32) to (34) respectively.

The decoder proper DEC1 also provides, at the same rate, the outgoing mode bit M defined by the Boolean function (22), as well as so-called code violation and disparity violation bits CV1 and CP1 respectively which $$CV1 = N0 + N1 + N5 + N6 + N2 \cdot \overline{m} + N4 \cdot m \quad (36)$$

$$CP1 = N0 + N1 + N5 + N6 \quad (37)$$

CV1 being the sum CP1 and a mode violation bit CM1 defined by:

$$CM1 = N2 \cdot \overline{m} + N4 \cdot m \quad (38)$$

The relations (36) to (38) have been obtained in the following way. As already mentioned above, for the 6-bit words used the number N of 1's is equal to 2, 3 or 4 and for the words with N=2, i.e. N2=1, the associated mode bit m is 1, whereas for the words with N=4, i.e. N4=1, the associated mode bit m is 0. Hence, a mode violation occurs when this is not so, i.e. when for N2=1 one has m=1 or when for N4=1 one has m=1. This leads to relation (38). Because for words used one has N2=1, N3=1 and N4=1, all words having parity N0=1, N1=1, N5=1 and N6=1 are faulty words. This means that a disparity violation occurs when the relation (37) is satisfied.

From the above, it follows that of the errors giving rise to a code violation part is due to a disparity violations.

Finally, the decoder proper DEC1 also generates at its like-named outputs, and at the word rate of 28 Mbit/sec. the inverse of the so-called channel presence bits PX, PY, PZ which indicate the presence in decoder DEC1 of one of the corresponding pair of auxiliary channels containing X, Y and Z respectively i.e.:
1 X 0 $\overline{X}$ 1 0 for X=0 and X=1,
1 Y 0 $\overline{Y}$ 0 1 for Y=0 and Y=1
and
1 0 1 0 Z $\overline{Z}$ for Z=0 and Z=1
These bits are defined by the following Boolean functions, as may be easily verified:

$$PX = k4 \cdot C \cdot E \quad (39)$$

$$PY = k4 \cdot C \cdot F \quad (40)$$

$$PZ = k4 \cdot C \quad (41)$$

wherein k4 is defined by the relation (23).

The outputs a/e, M, CV1 and CP1 of decoder DEC1 are connected to a latch circuit LC2 which is controlled by word clock CL28R, and the outputs X, Y, Z are connected to the data inputs of the respective sampler flipflops FF1, FF2 and FF3. The clock inputs of these flipflops are not only controlled by CL28R but also by PX, PY and $\overline{PZ}$ respectively, via AND-gates (not shown) included in these flipflops. Hence, X, Y and Z are only registered $\overline{PZ}$ are 0 respectively i.e. when the corresponding auxiliary information channel is present. As already mentioned above the frequency of occurence of an auxiliary channel is on the average equal to 140/5×32 MHx. The Q-outputs of flipflops FF1, FF2 and FF3 are designated PRO1, SUCO1 and SECO1 because they constitute the outputs of protection, supervision and service channels respectively.

The production switching channel output signal PRO1 is directly applied to the input PRI1 of a latch circuit LC3 in the coder circuit CODC1 and the supervision channel output signal SUCO1 is supplied to an input of AND-gate G1 in CODC1 as well as to supervision circuit SUCC (FIG. 5) or being processed therein. The service channel output SECO1 of sampling flipflop FF3 is applied to service circuit SECC (FIG. 6) for being processed therein. The decoder circuit DECC1 also includes a misalignment detection and correction circuit shown in FIG. 4, which will be considered later.

The coder circuit CODC1 includes a switch circuit SC which is controlled by a switch circuit control or alarm bit LBC1 which is provided by the alarm circuit ALCC (FIG. 4), as will be explained later. The switch circuit SC has data inputs a/e which constitute the normal data inputs of CODC1 and other inputs a/e of which a is grounded and the inputs b/e are connected to corresponding outputs b/e of decoder circuit DECC2, as already explained in relation to FIG. 2. When LBC1 is 0 the switches of SC are in their rest position shown, whereas they are in their operative position when LBC1 is 1. Switch circuit SC has data outputs a/e which are connected to like-named inputs a/e of the above mentioned latch circuit LC3. The latch circuit LC3 further has a supervision input SUC1 constituted by the common output of AND-gates G1 and G2 which have a common supervision loop enable input SULE1 and individual inputs SUCO1 and SUCI1. To the latter are connected the like-named outputs of FF2, as already mentioned, and of the supervision circuit SUCC. Finally, latch circuit LC3 also has a service input SEC1 to which the like-named output of service circuit SECC (FIG. 6) is connected.

This means that:
a protection channel output signal PROI is applied as a channel input signal PRII to latch circuit LC3;
depending on the binary condition 1 or 0 of the supervision loop enable signal SULEI provided by the supervision circuit SUCC, a supervision channel output signal SUCO1 generated by decoder circuit DECC1 or a supervision channel input signal SUCI1 generated by the supervision circuit SUCC is applied to latch circuit LC3;
a service channel output signal SEC 1 generated by the service circuit SECC is applied as a service channel input signal to latch circuit LC3. As will be explained later with respect to FIG. 6, depending on the binary condition 0 or 1 of the loop signal LS generated by a telephone circuit TS, a service channel output signal SECO1 generated by decoder circuit DECC1 or a service channel input signal SECI1 generated by the telephone station TS is applied to latch circuit LC3.

When a 5-bit data word a/e is applied to the latch circuit LC3 it is latched therein, possibly together with a protection signal and/or a supervision signal and/or a service signal, under the control of the word transmit clock CL28T. Thus the 5-bit word and possibly auxiliary information X and/or Y and/or Z is applied to the coder circuit proper COD1. As a result, the latter circuit provides a corresponding 6-bit word A/F wherein the bits A to F are defined by the above relations (1) to (6) as well as the clock bit SESOI defined by the relation (35). This 6-bit word is applied to a parallel-in-serial-out register PISO and the resulting serial data appear at the output A/F of CODC1 from which they are fed to the optical sender circuit OSC1.

The register PISO is controlled by the 168 MHz clock CL168R which is provided at the output of a switch circuit SC1 to which the receiver clocks CLI68R of optical receiver ORC1 and ORC2 are applied. The switch circuit SC1 is controlled by the above mentioned switch circuit control or alarm bit LBC1 so that when LBC1 is on 0 the clock CL168R of optical receiver ORC1 is used to control register PISO, whereas when the control bit LBC1 is 1, e.g. due to a cable rupture, the register PISO is controlled by the clock CL168R of optical receiver ORC2 so that the operation of CODC1 may continue independently from decoder circuit DECC1. The word transmit clock CL28T is obtained from CL168R by a division by 6 in divider DIVA6.

The coder circuit proper COD1 finally also provides at its output M the outgoing mode bit M defined by the relation (7). However, this mode bit M may be modified to M'. Indeed, this mode bit M is supplied to the input M' of latch circuit LC3 through the exclusive OR-gate EXOR the other input of which is constituted by the output of an AND-gate G3 which is controlled by the code violation signal CV1 and via an invertor by the switch circuit control signal LBC1. The output signal M' of EXOR may therefore be written:

$$M' = M \cdot \overline{CV1 \cdot \overline{LBC1}} + \overline{M} \cdot CV1 \cdot \overline{LBC1} \qquad (42)$$

Hence, once M'becomes m after having been latched in latch circuit LC3 one has:
when LBC1=1, m=M
when LBC1=0, m=M·$\overline{CV1}$ +$\overline{M}$·CV1
so that:
when CV1=0, m=M
when CV1=1, m=$\overline{M}$ This means that so long as LBC1=0 and there occurs no code violation, one has m=M, whereas when there is a code violation, one has m=$\overline{M}$, so that this code violation is transmitted as a mode violation. However, when LBC1=1 which occurs when there is a persistent failure, e.g. due to a cable rupture, m=M so that code violations are not transmitted.

Reference is now made to FIG. 4 for a description of a word misalignment detection and correction circuit included in decoder circuit DECC1.

The circuit is more particularly adapted to detect a word misalignment and to then perform a word alignment by executing clock phase corrections. A word misalignment may for instance be considered to have happened when at least 15 code violations (CV1=1) have been detected for series of 192 consecutive 6-bit words
and when at least one of these 15 code violations is a disparity violation (CP1=1). This is the reason why the circuit includes a divider-by-192 circuit DIV192 which is stepped by the word clock CL28R and provides an output signal 1 when it has counted 192 pulses word clock of CL28R, a divider-by-15 circuit which counts the number of times CV1 is on 1 and which provides an output signal 1 when it has counted 15 and a flipflop FF4 which is set to 1 when the disparity bit CPI becomes activated. The outputs of dividers DIV15 and DIV192 are connected to the data inputs of flipflops FF5 and FF6 which are clocked by bit clock CL168R. The Q-outputs of flipflops FF5 and FF6 are interconnected and constitute a reset input R for dividers DIV15, DIV192 and flipflop FF4. The $\overline{Q}$-outputs of flipflops FF4 and FF5 are both connected to a word misalignment indicating input $\overline{ALB1}$ of AND gate G4 which has another input connected to which bit clock signal CL168R is applied. The output of gate G4 is connected to a divider-by-6 DIVB6 whose output constitutes a first input of AND-gate G5 and CL168R is applied to the second input of gate G5. At the output of gate G5 the word clock signal CL28R is generated. The Q-outputs of flipflops FF5 and FF6 are also connected via an inverted I to an alarm output ALB1 which is connected to the alarm circuit ALCC (FIG. 5).

The circuit just described operates as follows.

Supposing that the divider circuits DIV15 and DIV192 and the flipflops FF4/6 have previously been reset to 0, the $\overline{Q}$-outputs of flipflops FF4 and FF5 are on 1 so that the bit clock signal CL168R is able to be supplied through gate G4 to the divider-by-6 circuit DIVB6. As a consequence the gate G5 provides at its output the 28 MHz word clock signal CL28R which is fed to divider DIV192 which thus counts the number of 6-bit words applied to decoder circuit DECC1. Each time for one of these words a code violation (CV1=1) is detected it is counted by divider DIV15, whereas when for one of these words a disparity violation (CP1=1) is detected it is registered in flipflop FF4. When divider DIV15 has counted 15 code violations its output signal becomes 1 and this 1-condition is registered in flipflop FF5 by the bit clock CL168R. Likewise, when divider DIV192 has counted 192 words its output signal becomes 1 and this 1 is registered in flipflop FF6 by the bit clock CL168R. The first of the flipflops FF5 and FF6 which has registered a 1 resets to 0 the dividers DIV192 and DIV15 as well as flipflop FF4. However, when divider DIV15 has counted 15 code violations CV1=1 before divider DIV192 has counted 192 words and when at least one of these code violations is a disparity violation CP1=1 which has been registered in flipflop FF4, the input $\overline{ALB1}$ of gate G4 is de-activated for a period of the bit clock signal CL168R. As a consequence, one period of the bit clock signal CL168R of 1/6th of a period of the word clock signal CL28R is skipped, so that a phase adjustment or word alignment of the words fed to decoder circuit DECC1 is performed. With the new word alignment thus obtained the possible errors are counted for a new period of 192 words and if the above thresholds are reached again, another 1/6th of a period of clock signal CL28R is skipped, etc. These phase adjustments are repeated until a correct word alignment is obtained. Since 6 possible phase adjustment steps of which only one normally leads to a correct word alignment, are possible, during a word realignment operation a maximum of 5 successive phase alignments may be performed.

As soon as 15 code violations (CV1=1) and simultaneously at least one a disparity violation (CP1=1) have been registered in flipflops FF5 and FF4 respectively, also the alarm output ALBl of invertor 1 is activated. This means that an alarm pulse ALBl which remains 1 for one period of CL168R is only produced when at least one of a number of code violations (CV1=1) is a disparity violation (CP1=1). It is clear that when no correct word alignment is possible, e.g. such as in the case of a cable rupture, no valid words will be received, so that an unlimited series of ALB1 pulses will be generated. These pulses are applied to the alarm circuit ALCC which is represented on FIG. 5 to which reference is now made.

In this circuit ALCC the pulses ALB1 are integrated in an integrator INT1 whose output signal is supplied to one input of a comparator circuit CO1 to the other input of which a threshold voltage VT is present. As a consequence, in case of e.g. a cable rupture, the integrated signal will at a certain moment exceed the threshold VT so that the output signal of CO1 will become 1 and the same is true for the alarm output signal LBC1 of OR-gate ORI to which the output signal of CO1 is applied.

Another alarm signal ALC1 is provided by the optical sender/receiver ORS1 and is applied to another input of OR-gate OR1 in a similar way as for ALB1.

The alarm signal LBC1 is applied to the supervision circuit SUCC which includes a microprocessor MP performing various functions in the repeater REP1, as indicated by the multiplying arrow at its output. The supervision circuit SUCC is able to process the above supervision channel output signal SUCO1 and to generate the above supervision channel input signal SUCI1 as well as the supervision enable signal SULE1.

As already explained above, the alarm signal LBC1 also controls the switch circuits SC and SC1 as well as the gate EXOR (see relation 42). More particularly, the following may be noted:

when LBC1=0 code violations (CV1=1) detected in decoder circuit DECC1 are communicated to CODC1 as mode violations. The advantage of requiring a disparity violation before a word alignment operation is performed is that when these mode violations are detected in a following repeater station or terminal equipment they will not give rise therein to a word alignment operation unless in this repeater or equipment also a disparity violation CP1=1 is detected. In this way, word synchronization loss in one repeater station does not affect the word alignment in following repeater stations and simultaneous operation of all the word alignment circuits of cascaded repeater stations is possible;

when LBC1=1 the bits b/c of the 5-bit words provided by DEEC2 are supplied to CODC1 whereas bit a of these words is made 0 by grounding wire a. In this way it is signalled to line termination equipment LTE1 that a cable failure has occurred. This does not affect the auxiliary information words because bit a of these words is anyhow 0. This may be easily detected in line termination equipment LTE1 e.g. by a detection NPN transistor whose base is connected to wire a and whose emitter is connected to alarm terminal. In FIG. 5 such a transistor is shown in decoder circuit DECC1 of repeater REP1 although it is not used therein. The 00010, 00001, 00000 words switched through to CODC1 they may be used for the transmission of new auxiliary information e.g. to indicated the failure. The communication of mode violations from decoder circuit DECC1 to CODC1 is stopped and in CODC1, the clock from optical receiver ORC2 is substituted for the clock of optical receiver ORC1. From the above description of the system it also follows that auxiliary information, e.g. Y and Z, is made available in each of the repeaters and that such information may be transmitted by any of them. This function is able to be performed because each repeater is provided with a relatively simple coder/decoder means, i.e. without requiring neither unscrambling and scrambling means nor a 140 MHz clock. Indeed, these coder/decoder means process on the parallel 28 MHz data, which are easily derived from the 168 MHz incoming data since the 28 MHz word clock may be obtained from the 168 MHz clock by a simple division by 6. In case one would operate on the 140 MHz data, a phaselocked loop would be necessary to recover the 140 MHz clock from the 168 MHz clock.

Reference is now made to FIG. 6 which shows the service circuit SECC in relative detail. This circuit includes a telephone circuit TS with a telephone receiver/transmitter (not shown), with a service channel input SEC1 on which e.g. an analog speech signal may be generated, with a loop signal output LS on which an activated loop enabling signal is generated when the receiver/transmitter is in the hooked-off condition and with a service input to which the service input SECO1, i.e. the output of flipflop FF3 in FIG. 3, is connected via an integrator circuit INT3. On SECO1 a digital speech signal may for instance be received which is then converted in INT3 into an analog speech signal. The output LS is connected to first inputs of AND-gates G6 and G7 via an invertor and directly respectively, the second inputs of these gates being constituted by the output SECO1 of sampling flipflop FF3 in FIG. 3 and by the output of a comparator C02 respectively. The common output SEC1 of gate G6 and gate G7 is connected to latch circuit LC3 in FIG. 3 and the corresponding output Z of the latch circuit LC3 is connected to the data input of a sampler flipflop FF7. The word clock signal CL28T and signal SESO1 which indicates the presence of the 5-bit word 00000, as already mentioned above, are applied to the same clock input of this flipflop FF7. The output signal of flipflop FF7 is integrated in the integrator INT2 before being applied to one input of the comparator C02 to the other input SECI1 of which the above analog speech signal is applied.

The circuit of FIG. 6 and associated parts of CODC1 and decoder circuit DECC1 shown on FIG. 3 constitute a delta modulator and a demodulator. The delta modulator includes comparator C02 wherein the analog speech signal on SECI1 is compared with the output signal of the integrator INT2. The input signal of this integrator is the sampled output signal of the comparator C02 since the output signal of C02 is fed back to the sampler circuit FF7, in case the signal LS is activated, via SEC1, latch circuit LC3 and Z. The demodulator circuit includes the cascade connection of the sampler circuit FF3 (FIG. 3) wherein the digital input signal Z is sampled by means of the clock signals CL28R and $\overline{PZ}$, as already explained, and the integrator INT3 wherein the sampled output signal SECO1 is integrated and then applied as an analog signal to telephone circuit TS.

The above described modulator and demodulator circuits are particularly characterized in that the sampler circuits FF7 and FF3 are controlled by SESO1 and $\overline{PZ}$ respectively which indicate the presence of the word 00000, to be converted into word 1010 $\overline{ZZ}$, and of the latter word 1010 $\overline{ZZ}$ respectively. Since these clock signals are the same no clock recovery circuit has to be provided in decoder circuit DECC1.

Figure 7:
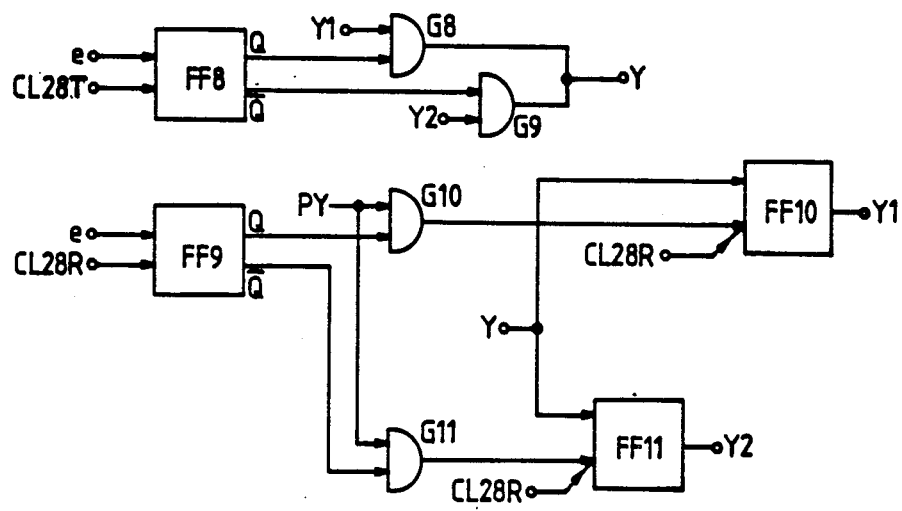
FIG. 7 shows a channel splitting up circuit used in the system of FIG. 1.

Finally, reference is made to FIG. 7 which shows a circuit able to split up an auxiliary channel, say Y, in e.g. two auxiliary channels Y1 and Y2. To this end the coding circuit CODC1 includes an additional flipflop FF8 whose data input is connected to the output e of the latch circuit LC3 and whose clock input is controlled by the transmit word clock CL28T. The Q- and $\overline{Q}$-outputs of flipflop FF8 are connected to first inputs of AND-gates G8 and G9 having a common output Y which is connected to coder circuit COD1 and having second inputs to which respective auxiliary bits Y1 and Y2 are to be applied. In this way, when the bit e of a 5-bit word preceding a 5-bit word, which after conversion becomes a 6-bit Y channel word, is 1 the auxiliary bit Y1 is inserted in this word, whereas when the bit e is 0, the auxiliary bit Y2 is inserted in the word. This means that this Y channel word is in fact split up in an Y1 and in an Y2 channel word.

In the decoder circuit DECC1 the detection of these Y1 and Y2 channel words is performed by the circuit also shown in FIG. 7. This circuit includes a flipflop FF9 to the data input of which the output e of decoder DEC1 (FIG. 3) is connected and whose clock input is controlled by the word receive clock CL28R. The Q- and $\overline{Q}$-outputs of flipflop FF9 are connected to first inputs of AND-gates G10 and G11, whose second inputs are controlled by the channel Y presence bit PY which has been defined previously. The outputs of these gates G10 and G11 constitute the clock inputs of flipflops FF10 and FF11 to the data inputs of which the output Y of decoder DEC1 is connected. The clock inputs of flipflops FF10 and FF11 are also controlled by CL28R and the Q-outputs of these flipflops are designated by Yl and Y2 respectively. This circuit operates as follows: depending on the bit e of a previously decoded word being 1 or 0 the output signal of gate G10 or G11 is activated when the following word is an Y-channel word, i.e. when PY is on 1. As a consequence the clock input of either flipflop FF10 or FF11 is then activated so that the information bit Y (which is in fact Y1 or Y2) is then registered either in flipflop FF10 or in flipflop FF11. Hence, the bit appearing at the Q-output of flipflop FF10 is Y1, whilst that provided at the Q-output of flipflop FFII is Y2.

It is clear that an auxiliary channel word instead of being split up into two subchannel words could also be split up in more than two subchannel words by using one or more of the bits a/e of one or more of the words, preceding the auxiliary channel word or following it.

It is apparent that the above circuits SUCC and SECC may be considered as user and source circuits since they are able to process received information (SUCO1, SECO1) and to generate information (SUCI1, SECI1).

While the principles of the invention have been described above in connection with specific apparatus, it is to be clearly understood that this description is made only by way of example and not as a limitation on the scope of the invention. It is contemplated, therefore, by the appended claims to cover any such modification as falls within the true spirit and scope of this invention.

What is claimed is:

1. In a digital data transmission system having a sending station able to convert serial p-bit words into serial q-bit words, with q larger than p, and a receiving station able to convert received serial q-bit words back into serial p-bit words, an improved repeater station for repeating transmissions from said sending station to said receiving station, said repeater station comprising:
    a sender unit comprising means for converting at least one predetermined p-bit word together with a auxiliary signal into a predetermined q-bit word and
    a receiver unit having a q-bit output connected in parallel to p-bit input of said sender unit, said receiver unit comprising
    means for converting a predetermined q-bit word back into a predetermined p-bit word and a auxiliary signal, and
    a user and source circuit responsive to a received auxiliary signal derived from the auxiliary signal provided by said receiver unit and including gating means controlled by a control signal provided by said user and source circuit for supplying to said sender unit either said received auxiliary signal or an alternative auxiliary signal provided by said user and source circuit.

2. In a digital data transmission system having a sending station able to convert serial p-bit words into serial q-bit words, with q larger than p, and a receiving station able to convert received serial q-bit words back into serial p-bit words, an improved repeater station for repeating transmissions from said sending station to said receiving station, said repeater station comprising:
    a sender unit comprising means for converting at least one predetermined p-bit word together with a auxiliary signal into a predetermined q-bit word and
    a receiver unit having a p-bit output connected in parallel to p-bit input of said sender unit, said receiver unit comprising
    means for converting a predetermined q-bit word back into a predetermined p-bit word and a auxiliary signal,
    word alignment detection means to produce a word misalignment indicating signal when for a first predetermined number of received words a second predetermined number of code violations is detected and at least one of these code violations is a word disparity violation, and
    word alignment means for adjusting the phase of a word clock, with which words are received, under the control of said word misalignment indicating signal.

3. The improved repeater station of claim 2, wherein the number of code violations is equal to the sum of the number of word disparity violations and the number of mode violations.

4. In a digital data transmission system having a sending station able to convert serial p-bit words into serial 6-bit words, with p smaller than 6, and a receiving station able to convert received serial 6-bit words back into serial p-bit words, an improved repeater station for repeating transmissions from said sending station to said receiving station, said repeater station comprising:
    a sender unit comprising means for converting at least one predetermined p-bit word together with a auxiliary signal into a predetermined 6-bit word and a receiver unit having an output connected to an input of said sender unit and comprising means for converting a predetermined 6-bit word back into a predetermined p-bit word and a auxiliary signal word misalignment detection means to produce a word misalignment indicating signal when for a first predetermined number of received words a second predeteermined number of code violations is detected and at least one of these code violations is a word disparity violation;

wherein said receiver unit means for converting 6-bit words produces for each 6-bit word received at the rate of a word clock and with mode m, a mode violation bit CM1, a disparity violation bit CP1 and a code violation bit CV1 by calculating the Boolean functions:

$$CM1 = N2 \cdot m + N4 \cdot m$$

$$CP1 = N0 + N1 + N5 + N6$$

$$CV1 = CM1 + CP1$$

wherein N0, N2, N4, N5 and N6 are 1 when and only when the number of 1's in the 6-bit word is equal to 0, 1, 2, 4, 5 and 6 respectively and the bits CV1 and CP1 are fed to said word misalignment detection means.

5. The improved repeater station of claim 4, wherein said word misalignment detection means includes:

the cascade connection of a first counter to which clock signals provided by said word clock are supplied and a first bistable device controlled by a bit clock;

the cascade connection of a second counter to which said code violation bits are fed and a second bistable device also controlled by said bit clock;

a third bistable device to which said disparity violation bits are supplied and having a $\overline{Q}$-output which is connected to the $\overline{Q}$-output of said second bistable device and on which it provides said word misalignment indicating signal the Q-outputs of said first and second bistable devices providing a reset signal for said first and second counters and said third bistable device, whereby said word misalignment indicating signal has a duration of one period of said bit clock signal.

6. The improved repeater station of claim 5 wherein said receiver unit further comprises:

word alignment means for adjusting the phase of a word clock with which these words are received, under the control of said word misalignment indicating signal, said word alignment means including first gating means responsive to said word misalignment indicating signal and said bit clock signal, a divider circuit having an input coupled to an output of said first gating means, and second gating means responsive to an output of said divider circuit and said bit clock signal for providing said word clock signal, whereby said word misalignment indicating signal prevents said bit clock signal from being supplied to said divider circuit during said one period.

7. In a digital data transmission system having a sending station able to convert serial p-bit words into serial q-bit words, with q larger than p, and a receiving station able to convert received serial q-bit words back into serial p-bit words, an improved repeater station for repeating transmissions from said sending station to said receiving station, said repeater station comprising a sender unit comprising means for converting at least one predetermined p-bit word together with a auxiliary signal into a predetermined q-bit word and a receiver unit having an output connected to an input of said sender unit, wherein said receiver unit comprises:

means for converting a predetermined q-bit word back into a predetermined p-bit word and a auxiliary signal;

word misalignment detection means to produce a word misalignment indicating signal when for a first predetermined number of received words a second predetermined number of code violations is detected and at least one of these code violations is a word disparity violation; and an alarm circuit which includes an integrator circuit to which said misalignment indicating signal is supplied and a comparator having an input coupled to an output of said integrator circuit for providing an alarm indicating signal when the said output of said integrator circuit exceeds a predetermined threshold.

8. The improved repeater station of claim 7, whrein said receiver unit converting means produces for each 6-bit word received with mode n, a mode violation bit CM1, a disparity violation bit CP1 and a code violation bit CV1 by calculating the Boolean functions:

$$CM1 = N2 \cdot m + N4 \cdot m$$

$$CP1 = N0 + N1 + N5 + N6$$

$$CV1 = CM1 + CP1,$$

wherein

N0, , N2, N4, N5 and N6 are 1 when and only when the number of 1's in the 6-bit word is equal to 0, 1, 2, 4, 5 and 6 respectively, the thus-calculated bits CV1 an CP1 are fed to said word alignment detection means, and said sender unit further comprises means controlled by said outgoing mode bit M, said code violation bit CP1 and said alarm signal LBC1 and providing a modified outgoing mode bit M' by calculating the Boolean function:

$$M' = M \cdot CV1 \cdot LBC1 + M \cdot CV1 \cdot LBC1$$

so that in the absence of an alarm, code violations are transmitted as mode violations, whilst in case of alarm no code violations are transmitted.

9. The improved repeater station of claim 7, wherein two sender units and two said receiver units are provided, for respective first and second directions of transmission said repeater station further comprises detecting means for detecting a failure in the part of the transmission medium in a first direction from said first station to the first receiving unit, switching means responsive to the detection of a failure by said detecting means, for connecting a at least a portion of the output of the second receiver unit associated with a second direction to a corresponding portion of the input of the first sender unit associated with said first direction and for supplying any remaining portion of said first sender unit input with a predetermined source of data.

10. In a digital data transmission system having first and second terminal stations at either end of an associated transmission medium, each of the terminal stations being able to convert serial p-bit words of a digital signal into serial q-bit words prior to transmission, with q larger than p, and able to convert received serial q-bit words back into serial p-bit words, an improved repeater station for repeating transmissions via an associated transmission medium between said first and second terminal stations, said repeater station comprising:

first and second sender units each comprising means for converting at least one predetermined p-bit word together with an auxilairy signal into a predetermined q-bit word, first and second receiver units each having an output connected to an input of a respective said sender unit and comprising means for converting said predetermined q-bit word back into a said predetermined p-bit word and said auxiliary signal, said first sender unit being normally coupled to said first receiver unit for transmission of p-bit data from said first station to said second station and said second sender unit being normally coupled to said second receiver unit for transmission of p-bit data from said second terminal station to said the first terminal station, failure detection means for detecting a failure of a part of the transmission medium from said first station to said repeater unit, and for generating in response thereto an auxiliary signal, and at least one switching means for connecting, in response to the detection by said failure detection means of a failure of a part of the transmission medium from said first terminal station to said first receiver unit, the output of the second receiver unit to the input of the first sender unit, thus enabling said predetermined p-bit words received by said second receiver unit from said second terminal station via a part of the transmission medium which present no failure to serve as an alternate source of p-bit words for converting, together with the auxiliary signal provided by said failure detection means, into predetermined q-bit words representative of such a failure for transmission from said first senser unit to said second terminal station via a part of the transmission medium which presents no failure.

11. The improved repeater station of claim 10, wherein said switching means supplies a bit clock signal controlling said second receiver unit to said first sender unit.

12. A method of converting a 5 bit code into a 6 bit code comprising the steps for each possible 5 bit word having a number n of 1's equal to 2 or 4 associating a different pair of 6-bit words which have different incoming modes m (m=0, m=1) characterized by a number N of 1's in the 6 bit word equal to 4 and 2 respectively, for each possible word for which n is different from 2 or 4 associating a different 6-bit word with N=3 and for each succeeding 5-bit words for which n is equal to 2 or 4 alternately taking the 6-bit word of the associated pair having a different m to that of the preceding 5-bit word for which n was equal to 2 or 4, and for each succeeding 5-bit words for which n is different from 2 or 4 into 6-bit words, taking the associated 6-bit word.

13. The data transmission method of claim 12, where in said conversion is in accordance with the following conversion table:

| n | a | b | c | d | e | A | B | C | D | E | F | N | m | A | B | C | D | E | F | N | m |
|---|---|---|---|---|---|---|---|---|---|---|---|---|---|---|---|---|---|---|---|---|---|
| 2 | a | b | c | d | e | 1 | $\bar{a}$ | $\bar{b}$ | $\bar{c}$ | $\bar{d}$ | $\bar{e}$ | 4 | 0 | 0 | a | b | c | d | e | 2 | 1 |
| 4 | a | b | c | d | e | 0 | a | b | c | d | e | 4 | 0 | 1 | $\bar{a}$ | $\bar{b}$ | $\bar{c}$ | $\bar{d}$ | $\bar{e}$ | 2 | 1 |
|   |   |   |   |   |   |   |   |   |   |   |   |   |   | A | B | C | D | E | F | N |   |
| 3 | a | b | c | d | e |   |   |   |   |   |   |   |   | 0 | a | b | c | d | e | 3 |   |
| 5 | a | b | c | d | e |   |   |   |   |   |   |   |   | 1 | $\bar{a}$ | $\bar{b}$ | $\bar{c}$ | d | e | 3 |   |
| 1 | a | b | c | 0 | 0 |   |   |   |   |   |   |   |   | 1 | $\bar{a}$ | $\bar{b}$ | $\bar{c}$ | p | p | 3 |   |
| 1 | 0 | 0 | 0 | 1 | 0 |   |   |   |   |   |   |   |   | 1 | X | 0 | $\bar{X}$ | 1 | 0 | 3 |   |
|   | 0 | 0 | 0 | 0 | 1 |   |   |   |   |   |   |   |   | 1 | Y | 0 | $\bar{Y}$ | 0 | 1 | 3 |   |
| 0 | 0 | 0 | 0 | 0 | 0 |   |   |   |   |   |   |   |   | 1 | 0 | 1 | 0 | Z | $\bar{Z}$ | 3 |   | wherein:

abcde and ABCDEF are said 5-bit and said 6-bit words respectively;

the last three 5- and 6-bit words are predetermined words associated with the transmission of auxiliary data;

X, Y, Z are said auxiliary data.

14. A repeater station for repeating 6-bit transmissions from a sending station to a receiving station of a data transmission system using the transmitting method of claim 5, said repeater station comprising:

a sender unit comprising means for converting each 5-bit word abcde with incoming mode m and auxiliary signal X, Y, Z to a 6-bit word ABCDEF and for determining an outgoing mode M to be used in a following conversion operation by calculating the Boolean functions:

$A = n2 \cdot \bar{m} + n4 \cdot m + n0 + n1 + n5$
$B = (A \cdot a + \bar{A} \cdot a) \cdot \overline{n0} \cdot k2 + n1 \cdot (d \cdot X + e \cdot Y)$
$C = (A \cdot \bar{b} + A \cdot b) \cdot k2 + n0$
$D = (A \cdot \bar{c} + A \cdot c) \cdot k2 \cdot \overline{n0} + n1 \cdot (d \cdot \bar{X} + e \cdot Y)$
$E = d \cdot \overline{k3} + \bar{d} \cdot k3 + n0 \cdot Z$
$F = e \cdot \overline{k3} + \bar{e} \cdot k3 + n0 \cdot \bar{Z}$
$M = m \cdot \overline{k1} + \bar{m} \cdot k1$ wherein:

$k1 = n2 + n4$
$k2 = \overline{n1} \cdot (d \cdot e + \bar{d} \cdot \bar{e})$
$k3 = A \cdot \overline{n1} \cdot \overline{n5}$ n0 to n5 are bits which are set to 1 when the number n of 1's in the 5 bit word is equal to 0 to 5 respectively; and a receiver unit having an output connected to an input of said sender unit and comprising means for converting a predetermined 6-bit word back into a predetermined 5-bit word and auxiliary signal X, Y, Z.

15. A repeater station for repeating 6-bit transmissions from a sending station to a receivng station of a data transmission system using the transmitting method of claim 5, said repeater station comprising:
a sender unit comprising means for converting each 5-bit word abcde and auxiliary signal X, Y, Z to a 6-bit word ABCDEF and
a receiver unit having an output connected to an input of said sender unit and comprising means for converting each 6-bit word ABCDEF with incloming mode m into a 5-bit word abcde and auxiliary signals X, Y, Z and for determining an outgoing mode M to be used in a following conversion operation by calculating the Boolean functions:

$$a = (\overline{B} \cdot A + B \cdot \overline{A}) \cdot \overline{k4}$$
$$b = (\overline{C} \cdot A + C \cdot \overline{A}) \cdot \overline{k4}$$
$$c = (\overline{D} \cdot A + D \cdot \overline{A}) \cdot \overline{k4}$$
$$d = (\overline{E} \cdot k5 + E \cdot \overline{k5}) \cdot \overline{k4} \cdot \overline{C}$$
$$e = (\overline{F} \cdot k5 + F \cdot \overline{k5}) \cdot \overline{k4} \cdot \overline{C}$$
$$M = m \cdot N3 + N4 + N5 + N6$$
$$X = k4 \cdot B \cdot E$$
$$Y = k4 \cdot B \cdot F$$
$$Z = k4 \cdot C \cdot E$$

wherein:

$$k4 = A \cdot N3 \cdot (E \cdot \overline{F} + \overline{E} \cdot F)$$
$$k5 = A \cdot N3$$

N0 to N6are bits which are 1 when the number N of 1's in the 6 bit word is equal to 0 to 6 respectively.

16. In combination with a first converter circuit for comverting at least one predetermined p-bit data word together with an input data signal into a predetermined q-bit data word:
a delta modulator circuit for deriving said digital data signal from an analog data signal, said delta modulator circuit comprising a sampler circuit for sampling said analog data signal, said sampler circuit being clocked by a word clock signal and by a signal indicating the presence of said predetermined p-bit word, an integrator circuit having an input coupled to an output of said sampler circuit, and a comparator circuit whreein said analog data signal and the output signal of said integrator circuit are compared, said digital data signal being provided at the output of said comparator circuit;
a second converter circuit frr converting said predetermined q-bit data words into said predetermined p-bit data words and an output digital data signal; and
a demodulator circuit responsive to an output of said second converter circuit, said demodulator circuit including the cascade connoction of a second sampler circuit to which said output digital data signal is supplied, and a second integrator circuit which provides said analog data signal at its output, said second sampler circuit being clocked by a word clock signal and by a signal indicating the pressure of said predetermined q-bit data word.

17. A data transmission system comprising converter means for converting a data stream of p-bit data words into a corresponding data stream of q-bit data words, wherein
said converter means is able to convert at least one predetermined p-bit data word together with any selected one of a plurality of digital data signals into a corresponding one of a same plurality of different predetermined q-bit data words and
said converter means further comprises
register means for registering information concerning at least one of the p-bit datawords adjacent to said predetermined p-bit data word, and
gating means to which said plurality of digital data signals are applied and responsive to said registering means for selecting said selected one of said plurality of digital data signals as a function of said registered information.

18. A data transmission system comprising converter means for converting a data stream of p-bit data words into a corresponding data stream of q-bit data words, wherein
said converter means is able to convert at least one predetermined p-bit data word together with any selected one of a plurality of digital data signals into a corresponding one of a same plurality of different predetermined q-bit data words;
said converter means further comprises
register means for registering information concerning at least one of the p-bit data words adjacent to said predetermined p-bit data word, and
gating means to which said plurality of digital data signals are modified and responsive to said registering means for selecting said selected one of said plurality of digital data signals as a function of information registered by the register means; and
said register information is constituted by the last bit of the p-bit data word applied to said converter means and preceding said predetermined p-bit data word.

19. A data transmission system comprising
first converter means for converting a data stream of p-bit data words into a corresponding data stream of q-bit data words, wherein said first converter means is able to convert at least one predetermined p-bit data word together with any selected one of a plurality of digital data signals into a corresponding one of same plurality of different predetermined q-bit data words, said converter means further comprising
register means for registering information concerning at least one of the p-bit data words adjacent to said predetermined p-bit data word, and
gating means to which said plurality of digital data signals are applied and responsive to said registering means for selecting said selected one of said plurality of digital data signals as a function of said registered information; and second converter means for converting said q-bit data words back into p-bit data words and for converting said q-bit data word back into said predetermined p-bit data word and said selected one of said plurality of digital data signals, said second converter means further comprising
second register means for registering said information concerning at least one of the p-bit data words adjacent to said predetermined p-bit data word, and
second gating means responsive to said second registering means and to a control signal indicative of the presence of said predetermined q-bit data word for supplying said selected digital data signal to a corresponding output amomg a plurality of outputs.

20. The data transmission system according to claim 19, wherein
said information is the last bit of the p-bit data word provided by said second converter means and preceding said predetermined data word.

* * * * *

UNITED STATES PATENT AND TRADEMARK OFFICE
CERTIFICATE OF CORRECTION

PATENT NO. : 4,876,695

DATED : October 24, 1989

INVENTOR(S) : H.F.J. Witters; J.C.A.M. Wouters

It is certified that error appears in the above-identified patent and that said Letters Patent is hereby corrected as shown below:

Column 1, line 9, change "pbit" to -- p-bit --.

Column 3, line 65, change "Z,Z" to -- $Z,\overline{Z}$ --.

Column 5, line 21, change "well" to -- will --.
Column 5, line 32, change "abode" to -- abcde --.
Column 5, line 33, change "ABODE" to -- ABCDE --.
Column 5, line 65, change "auxiliry" to -- auxiliary --.

Column 6, line 29, after "to" insert -- 1 --.

Column 10, line 42, change "SUCOI" to -- SUCO1 --.
Column 10, line 50, change "FIG." to -- FIG. 2 --.
Column 10, line 62, change "n" to -- in --.

Column 11, line 12, change "informatoon" to -- information --.
Column 11, line 20, after "which" insert -- are defined by the following Boolean functions: --.
Column 11, line 44, before "disparity" delete "a".
Column 11, lines 59,61, put lines over the equations as follows:

$$\overline{PX} = \overline{k4 \cdot \overline{C} \cdot E} \quad (39)$$

$$\overline{PY} = \overline{k4 \cdot \overline{C} \cdot F} \quad (40)$$

$$\overline{PZ} = k4 \cdot C \quad (41)$$

UNITED STATES PATENT AND TRADEMARK OFFICE
CERTIFICATE OF CORRECTION

PATENT NO. : 4,876,695

DATED : October 24, 1989

INVENTOR(S) : H.F.J. Witters; J.C.A.M. Wouters

It is certified that error appears in the above-identified patent and that said Letters Patent is hereby corrected as shown below:

Column 12, line 5, after "registered" insert -- In flip-flops FE1, FE2, FE3 by clock CL28R when $\overline{PX},\overline{PY}$ --.
Column 12, line 49, change "PROI" to -- PRO1 --.
Column 12, line 50, change "PRII" to -- PRI1 --.
Column 12, line 52, change "SULEI" to -- SULE1 --.

Column 13, line 18, change "CLI68R" to -- CL168R --.
Column 13, line 66, delete the space between "and" and "words".

Column 14, line 7, change "CPI"to -- CP1 --.

Column 15, line 17, change "cirouit" to -- circuit --.
Column 15, line 23, change "ORI" to -- OR1 --.

Column 16, line 2, change "indicated" to -- indicate --.

Column 17, line 46, after "is" change "an" to -- a --.
Column 17, line 53, change "FFII" to -- FF11 --.

In the Claims

Column 18, line 12, after "with" change "a" to -- an --.
Column 18, line 19, after "and" change "a" to -- an --.
Column 18, line 37, after "with" change "a" to -- an --.
Column 18, line 43, after "and" change "a" to -- an --.
Column 18, line 67, after "with" change "a" to -- an --.

Column 19, line 4, after "and" change "a" to -- an --.

UNITED STATES PATENT AND TRADEMARK OFFICE
CERTIFICATE OF CORRECTION

PATENT NO. : 4,876,695
DATED : October 24, 1989
INVENTOR(S) : H.F.J. Witters; J.C.A.M. Wouters It is certified that error appears in the above-identified patent and that said Letters Patent is hereby corrected as shown below:

Column 19, line 9, change "predeteermined" to -- predetermined --.
Column 19, line 19, in the first equation change "N2·m" to -- $N2 \cdot \bar{m}$ --.

Column 20, line 4, after "with" change "a" to -- an --.
Column 20, line 9, after "and" change "a" to -- an --.
Column 20, line 26, change "whrein'" to -- wherein --.
Column 20, line 38, change "N6are" to -- N6 are --.
Column 20, line 41, after "CV1" change "an" to -- and --.
Column 20, line 64, after "connecting" delete "a".

Column 21, line 15, change "auxilairy" to -- auxiliary --.
Column 21, line 40, after "said" delete "the".
Column 21, line 60, change "sensor" to -- sender --.
Column 21, line 67, change "5 bit" to -- 5-bit --.
Column 21, line 67, change "6 bit" to -- 6-bit --.

Column 22, line 1, change "5 bit" to -- 5-bit --.
Column 22, line 6, after "possible" insert -- 5-bit --.
Column 22, line 17, change "where in" to -- wherein --.
Column 22, line 34, change "abode" to -- abcde --.
Column 22, line 39, after "data" insert -- ; and [¶] -the bar symbol "⁻" indicated binary complement --.
Column 22, line 45, change "abode" to -- abcde --.
Column 22, line 64, change "5 bit" to -- 5-bit --.

Column 23, line 4, change "receivng" to -- receiving --.
Column 23, line 8, change "abode" to -- abcde --.
Column 23, line 12, change "cloming" to -- coming --.

UNITED STATES PATENT AND TRADEMARK OFFICE
CERTIFICATE OF CORRECTION

PATENT NO. : 4,876,695

DATED : October 24, 1989

INVENTOR(S) : H.F.J. Witters; J.C.A.M. Wouters

It is certified that error appears in the above-identified patent and that said Letters Patent is hereby corrected as shown below:

```
Column 23, line 28, change "k5 = S·N3" to -- K5 = A·N̄3 --.
Column 23, line 30, change "N6are" to -- N6 are --.
Column 23, line 31, change "6 bit" to -- 6-bit --.
Column 23, line 34, after "input" insert -- digital --.
Column 23, line 43, change "whreein' to -- wherein --.
Column 23, line 47, change "frr" to -- for --.
Column 23, line 53, change "connoction" to
          -- connection --.
Column 23, line 58, change "pressure" to -- presence --.

Column 24, line 2, change "datawords" to -- data words --.
Column 24, line 37, before "same" insert -- a --.
Column 24, line 62, change "amomg" to -- among --.
```

Signed and Sealed this

Twenty-fourth Day of September, 1991

Attest:

HARRY F. MANBECK, JR.

*Attesting Officer*  *Commissioner of Patents and Trademarks*